(12) United States Patent
Chiou et al.

(10) Patent No.: US 12,334,854 B2
(45) Date of Patent: Jun. 17, 2025

(54) POWER INTEGRATED MODULE AND MOTOR CONTROL SYSTEM

(71) Applicant: Industrial Technology Research Institute, Hsinchu (TW)

(72) Inventors: Shian-Chiau Chiou, Miaoli County (TW); Yu-Hua Cheng, Hsinchu County (TW); Chih-Ming Tzeng, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 246 days.

(21) Appl. No.: 18/307,794

(22) Filed: Apr. 26, 2023

(65) Prior Publication Data

US 2024/0266985 A1 Aug. 8, 2024

(30) Foreign Application Priority Data

Feb. 8, 2023 (TW) ................. 112104483

(51) Int. Cl.
| | |
|---|---|
| *H02P 27/06* | (2006.01) |
| *H02M 5/458* | (2006.01) |
| *H02M 7/219* | (2006.01) |
| *H02M 7/5387* | (2007.01) |
| *H02P 29/024* | (2016.01) |

(52) U.S. Cl.
CPC .......... *H02P 29/027* (2013.01); *H02P 29/025* (2013.01)

(58) Field of Classification Search
CPC ...... H02P 27/06; H02P 29/025; H02P 29/027; H02M 7/217; H02M 7/5387; H02M 7/53875; H02M 5/458; H02M 5/4585
See application file for complete search history.

(56) References Cited

U.S. PATENT DOCUMENTS

| | | | |
|---|---|---|---|
| 6,987,670 B2 | 1/2006 | Ahmed et al. | |
| 9,190,935 B2 * | 11/2015 | Takase | H02M 7/797 |

(Continued)

FOREIGN PATENT DOCUMENTS

| | | |
|---|---|---|
| AU | 2010299394 | 2/2014 |
| CN | 102904517 | 1/2013 |

(Continued)

OTHER PUBLICATIONS

"Office Action of Taiwan Counterpart Application", issued on Feb. 5, 2024, p. 1-p. 5.

(Continued)

*Primary Examiner* — Thai T Dinh
(74) *Attorney, Agent, or Firm* — JCIPRNET (57) ABSTRACT

A power integrated module (PIM) and a motor control system are provided. The PIM is adapted to drive a motor. The PIM includes a first transformation circuit, a second transformation circuit, and a plurality of shunt units. The first transformation circuit includes a plurality of first half-bridge circuits, and a coupling relationship among the first half-bridge circuits is selected, so that the first transformation circuit is operated in a rectifier mode or an inverter mode. The second transformation circuit includes a plurality of second half-bridge circuits coupled to the motor. The shunt units are respectively coupled between the second half-bridge circuits and the motor and configured to sense a current between the second transformation circuit and the motor.

20 Claims, 6 Drawing Sheets

(56) References Cited

U.S. PATENT DOCUMENTS

| | | | |
|---|---|---|---|
| 9,537,423 B2 | | 1/2017 | Mao |
| 9,983,249 B2 | * | 5/2018 | Lee et al. |
| 10,171,005 B2 | * | 1/2019 | Sakakibara ............. H02M 1/08 |
| 11,444,547 B2 | * | 9/2022 | Kuroki .................. H02M 3/158 |
| 11,539,283 B1 | * | 12/2022 | Hoffman ............. H02M 7/5387 |
| 12,170,490 B2 | * | 12/2024 | Burgermeister ........ H02M 1/32 |
| 2005/0253457 A1 | | 11/2005 | Pierret et al. |
| 2010/0072942 A1 | | 3/2010 | Kowalewski et al. |
| 2022/0219549 A1 | | 7/2022 | Slepchenkov et al. |

FOREIGN PATENT DOCUMENTS

| | | |
|---|---|---|
| CN | 112924838 | 6/2021 |
| CN | 215498777 | 1/2022 |
| CN | 114448292 | 5/2022 |
| CN | 114977250 | 8/2022 |
| TW | 661633 | 6/2019 |

OTHER PUBLICATIONS

Zhijun Li et al., "The Power Density, Efficiency and EMC Improvement Based on All-SiC Power Devices in the Power Module for Ballast Water Management System", IECON 2019—45th Annual Conference of the IEEE Industrial Electronics Society, Oct. 14-17, 2019, pp. 5160-5163.

* cited by examiner

POWER INTEGRATED MODULE AND MOTOR CONTROL SYSTEM

CROSS-REFERENCE TO RELATED APPLICATION

This application claims the priority benefit of Taiwanese application Ser. No. 11/210,4483, filed on Feb. 8, 2023. The entirety of the above-mentioned patent application is hereby incorporated by reference herein and made a part of this specification.

TECHNICAL FIELD

The disclosure relates to a power integrated module (PIM) and a motor control system.

BACKGROUND

In a general power integrated module (PIM), a rectifier is able to perform one single function, and thus the conventional PIM capable of performing one single function could not comply with the changes in product requirements.

SUMMARY

An embodiment of the disclosure provides a PIM that is adapted to drive a motor. The PIM includes a first transformation circuit, a second transformation circuit, and a plurality of shunt units. The first transformation circuit includes at least three first half-bridge circuits, and a coupling relationship among the first half-bridge circuits is selected, so that the first transformation circuit may be operated in a voltage boosting and bucking mode, a rectifier mode, or an inverter mode. The second transformation circuit includes a plurality of second half-bridge circuits coupled to the motor. The shunt units are respectively coupled between the second half-bridge circuits and the motor and configured to sense a current between the second transformation circuit and the motor.

An embodiment of the disclosure provides a motor control system that includes a first motor, a second motor, and a PIM. The PIM includes a first transformation circuit, a second transformation circuit, and at least three shunt units. The first transformation circuit includes at least three first half-bridge circuits, and a coupling relationship among the at least three first half-bridge circuits is selected, so that the first transformation circuit may be operated in a voltage boosting and bucking mode, a rectifier mode, or an inverter mode and coupled to the first motor. The second transformation circuit includes at least three second half-bridge circuits coupled to the second motor, and the second transformation circuit is configured to drive the second motor. The shunt units are respectively coupled between the at least three second half-bridge circuits and the second motor and configured to sense a current between the second transformation circuit and the second motor.

Several exemplary embodiments accompanied with figures are described in detail below to further describe the disclosure in details.

BRIEF DESCRIPTION OF THE DRAWINGS

The accompanying drawings are included to provide a further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Figure 1:
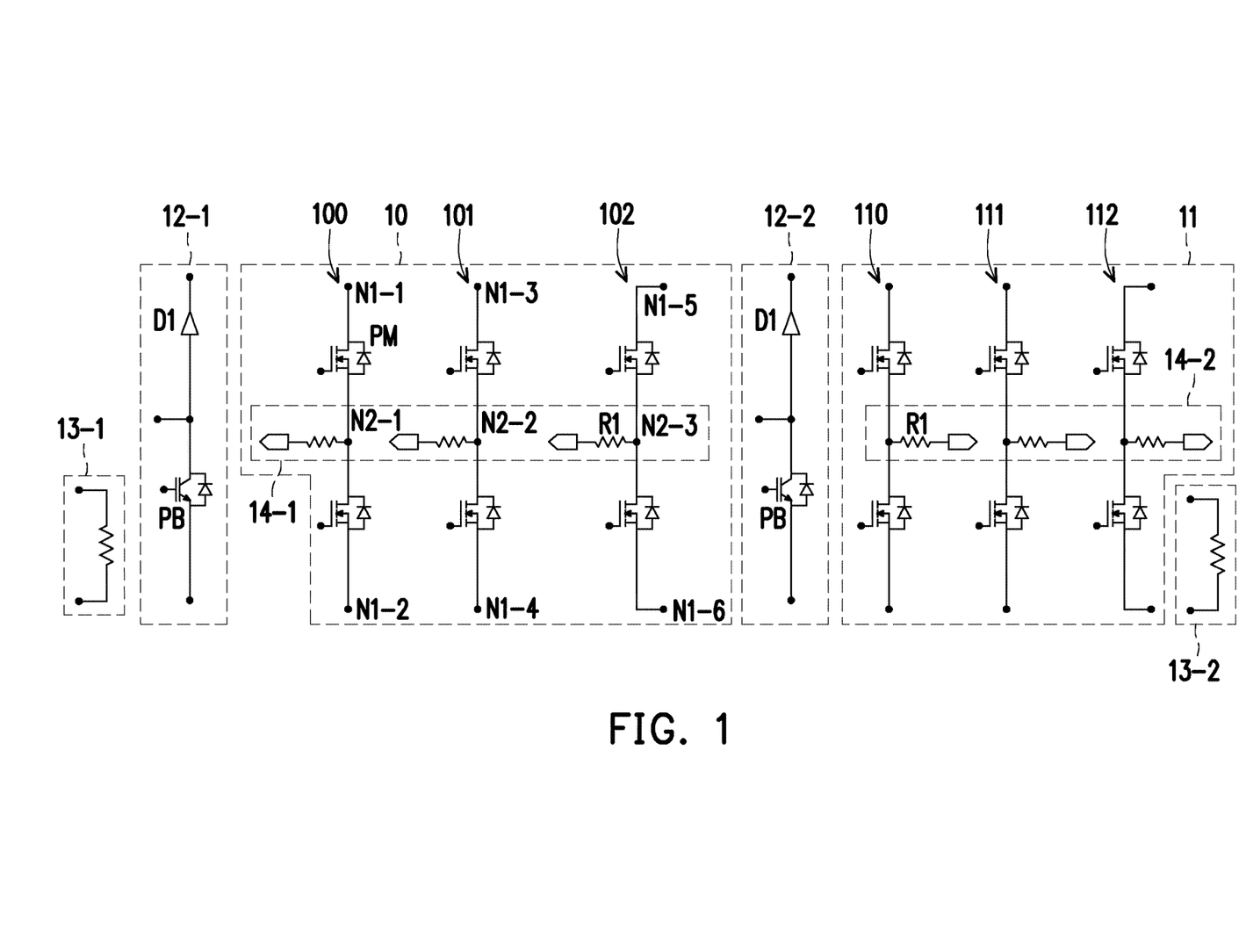
FIG. 1 is a schematic view illustrating a power integrated module (PIM) according to an embodiment of the disclosure.

FIG. 1 is a schematic view illustrating a power integrated module (PIM) 1 according to an embodiment of the disclosure. The PIM 1 may be configured to receive power from a power source to drive one or a plurality of motors. In general, the PIM 1 includes a first transformation circuit 10, a second transformation circuit 11, brake arms 12-1 and 12-2, temperature sensing devices 13-1 and 13-2, and current sensing circuits 14-1 and 14-2. The first transformation circuit 10 includes half-bridge circuits 100 to 102, and the second transformation circuit 11 includes half-bridge circuits 110 to 112. The brake arms 12-1 and 12-2 are respectively connected in parallel to the first transformation circuit 10 and the second transformation circuit 11 and are configured to absorb energy generated during motor voltage conversion, so as to prevent a surge current from being generated when a rotation speed of the motor suddenly drops and the motor in operation is terminated. The temperature sensing devices 13-1 and 13-2 are respectively disposed adjacent to the first transformation circuit 10 and the second transformation circuit 11 and may be configured to sense an operating ambient temperature of the first transformation circuit 10 and an operating ambient temperature of the second transformation circuit 11, respectively.

In an embodiment, the half-bridge circuits 100 to 102 of the first transformation circuit 10 are made by serially connecting power switch devices, i.e., transistors PM, such as metal-oxide-semiconductor field effect transistors (MOSFET), insulated gate bipolar transistors (IGBT), or any other appropriate semiconductor device, and each half-bridge circuit includes at least two power switch devices (the transistors PM) connected in series. Specifically, one or more of the half-bridge circuits 100 to 102 may be selected to participate in the operation of the first transformation circuit 10. Generally, since a coupling relationship among the half-bridge circuits 100 to 102 of the first transformation circuit 10 is selected, the wiring layout of the half-bridge circuits 100 to 102 or a control signal may be applied to control each switch device to be conductive or nonconductive, whereby the first transformation circuit 10 is operated in a voltage boosting and bucking mode, a rectifier mode, or an inverter mode to drive a motor. Besides, the quantity of the half-bridge circuits participating in the operation of the first transformation circuit 10 may be correspondingly adjusted according to system requirements. Therefore, the coupling relationship in the first transformation circuit 10 and the quantity of the half-bridge circuits participating in the operation may be adjusted according to different usage requirements, so as to effectively improve the system compatibility of the PIM 1.

In an embodiment, the second transformation circuit 11 mayor instance, have the same circuit structure as or a different circuit structure from that of the first transformation circuit 10. For instance, the first and second transformation circuits 10 and 11 have the same quantity of the half-bridge circuits, and each half-bridge circuit may be composed of at least two serially connected power switch devices (the transistors PM). By properly controlling each transistor PM to be conductive or nonconductive, the received direct current (DC) voltage is converted to an alternating current (AC) voltage. Although each half-bridge circuit shown in FIG. 1 is formed by serially connecting two power switch devices, the quantity of the power switch devices connected in series in each half-bridge circuit may certainly be increased according to different design requirements. Similarly, each half-bridge circuit of the second transformation circuit 11 may be connected or disconnected, whereby the quantity of the half-bridge circuits participating in the operation of the second transformation circuit 11 is adjusted.

In an embodiment, the brake arms 12-1 and 12-2 are connected in parallel to the first transformation circuit 10 and the second transformation circuit 11, respectively, and each of the brake arms 12-1 and 12-2 includes a diode D1 and a transistor PB connected in series for absorbing the energy generated during motor voltage conversion, so as to prevent the surge current from being generated when the rotation speed of the motor suddenly drops and the motor in operation is terminated.

In an embodiment, the temperature sensing devices 13-1 and 13-2 are disposed adjacent to the first transformation circuit 10 and the second transformation circuit 11 respectively and may be configured to sense the operating ambient temperature of the first transformation circuit 10 and the operating ambient temperature of the second transformation circuit 11, respectively. For instance, the temperature sensing devices 13-1 and 13-2 may be, for instance, temperature sensors formed by a negative temperature coefficient (NTC) resistor and configured to sense the temperature in the environment.

In an embodiment, the current sensing circuits 14-1 and 14-2 are respectively coupled to the first transformation circuit 10 and the second transformation circuit 11. Specifically, the current sensing circuits 14-1 and 14-2 may respectively have the shunt unit (e.g., a resistor R1) of the same quantity as the quantity of the half-bridge circuits of the first transformation circuit 10 and the second transformation circuit 11. Each shunt unit (e.g., the resistor R1) may be configured to sense a current flowing through the corresponding half-bridge circuit and provide a sensed result to a controller or an external circuit as the basis for controlling the operation. For instance, when the shunt unit is implemented in form of the resistor R1 as shown in FIG. 1, a value of the current flowing through each half-bridge circuit may be sensed by detecting a potential difference or a voltage drop at both ends of the resistor R1, and the controller or the external circuit may determine an operation status of the first transformation circuit 10 and the second transformation circuit 11 according to the sensing voltage and correspondingly control each transistor PM of the first transformation circuit 10 and the second transformation circuit 11 to be conductive or nonconductive.

In FIG. 1, each of the first transformation circuit 10 and the second transformation circuit 11 includes three half-bridge circuits; however, the half-bridge circuits of different quantities fall within the scope of variations of the embodiments of the PIM. For instance, the first transformation circuit 10 and/or the second transformation circuit 11 may 11 may include two, three, four, or more half-bridge circuits. Alternatively, the first transformation circuit 10 and/or the second transformation circuit 11 may have the same or different circuit structures; that is, the quantity of the half-bridge circuits of the first transformation circuit 10 and the second transformation circuit 11 may be the same or different. In the event that the half-bridge circuits of the first transformation circuit 10 and the second transformation circuit 11 are of the same quantity, the first transformation circuit 10 and the second transformation circuit 11 may be implemented by applying the same circuit module, thereby reducing the design complexity of the PIM 1. By contrast, given that the half-bridge circuits of the first transformation circuit 10 and the second transformation circuit 11 are of different quantities, the manufacturing costs of the PIM 1 may be appropriately reduced according to the design requirements. In brief, the quantity of the half-bridge circuits participating in the driving operation of the first transformation circuit 10 and the second transformation circuit 11 may be adjusted according to the specifications of the external power source or motor coupled to the first transformation circuit 10 and the second transformation circuit 11, so as to improve the system compatibility of the PIM 1.

In an embodiment, when the PIM 1 is configured to drive one single motor, the first transformation circuit 10 has at least two half-bridge circuits 100, 101, and 102 connected to each other and operated in the rectifier mode, and the three half-bridge circuits 110, 111, and 112 of the second transformation circuit 11 form a three-phase bridge inverter, so that the first transformation circuit 10 and the second transformation circuit 11 may be coupled to collectively drive the motor. In this embodiment, power integrated module 1 could be coupled with an external power source with alternating current voltage, and convert the alternating current voltage to drive the motor. Specifically, the first transformation circuit 10 may be coupled to an external power source to receive an AC voltage and convert the AC voltage to a DC voltage. The second transformation circuit 11 may receive the DC voltage from the first transformation circuit 10 and convert the DC voltage into a three-phase AC voltage to provide appropriate power to drive the motor.

In an embodiment, when the PIM 1 is configured to drive two motors, both the first transformation circuit 10 and the second transformation circuit 11 are operated in the inverter mode, so that both the first transformation circuit 10 and the second transformation circuit 11 may be coupled to different motors to perform the driving operation individually. In this embodiment, the first transformation circuit 10 and the second transformation circuit 11 may be coupled to an external power source with the DC voltage, receive the DC voltage, and convert the DC voltage to the AC voltage, so as to provide appropriate power to drive the motors that are respectively connected to the first transformation circuit 10 and the second transformation circuit 11.

FIG. 2A to FIG. 2E are schematic views illustrating various operation conditions of the first transformation circuit 10 depicted in FIG. 1. The following exemplary embodiments shown in FIG. 2A to FIG. 2E serve to explain how the first transformation circuit 10 is operated in the rectifier mode or the inverter mode. In addition, the first transformation circuit 10 may 10 may be further operated in the voltage boosting and bucking mode or in a voltage boosting and bucking mode characterized by a high current resistance capability.

Figure 2A:
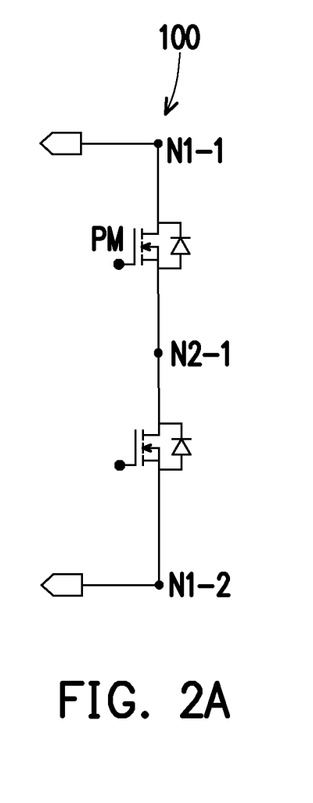
FIG. 2A to FIG. 2E are schematic views illustrating various operation conditions of the first transformation circuit 10 depicted in FIG. 1.

As shown in FIG. 2A, in the first transformation circuit 10, one of the half-bridge circuits (e.g., the half-bridge circuit 100) may be, for instance, switched to be operated as a boost circuit or a buck circuit. The first transformation circuit 10 may be coupled to an external power source to receive a DC voltage and may adjust a level of the received voltage in line with other capacitors, inductors, and control signals coupled to the first transformation circuit 10. For instance, the voltage level adjusted by the half-bridge circuit 100 may be, for instance, provided to the second transformation circuit 11, so that the second transformation circuit 11 may generate an AC voltage according to the appropriate DC voltage level to drive the motor.

Figure 2B:
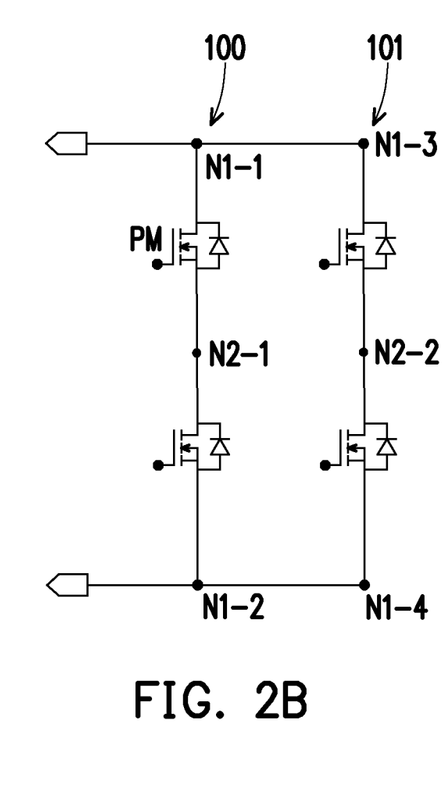

As shown in FIG. 2B, when two of the half-bridge circuits (e.g., the half-bridge circuits 100 and 101) of the first transformation circuit 10 are connected, and the remaining half-bridge circuit (e.g., the half-bridge circuit 102) is disconnected, the first transformation circuit 10 may be operated in the rectifier mode or the inverter mode. In an embodiment, when the first transformation circuit 10 is operated in the inverter mode, although it is not clearly shown in FIG. 2B, nodes (e.g., first nodes) N1-1, N1-2, N1-3, and N1-4 located at two ends and serially connected to two power switch devices (e.g., the transistors PM) in the half-bridge circuits 100 and 101 may be coupled to an external power source to receive the DC voltage, and the DC voltage is converted through the nodes (e.g., second nodes) N2-1 and N2-2 coupled between the two power switch devices (e.g., the transistors PM), so as to output the AC current voltage, and the first transformation circuit 10 acts as a single phase full bridge inverter. Thereby, through a control signal which properly turns on or turns off the transistor PM in each half-bridge circuit, the first transformation circuit 10 may convert the DC voltage into the AC voltage to be grid-connected with single-phase power for further parallel control and application.

Although not clearly shown in FIG. 2B, the nodes (e.g., the second nodes) N2-1 and N2-2 coupled between the two power switch devices in the half-bridge circuits 100 and 101 may be coupled to an external power source to receive the AC voltage, and the nodes (e.g., the first nodes) N1-1 to N1-4 located at two ends and serially connected to the two power switch devices (e.g., the transistors PM) may be coupled to the respective ends of the second transformation circuit 11. As such, through the control signal which properly turns on or turns off the transistor PM in each half-bridge circuit, the first transformation circuit 10 converts the AC voltage to the DC voltage and provides the DC voltage to the second transformation circuit 11.

Figure 2C:
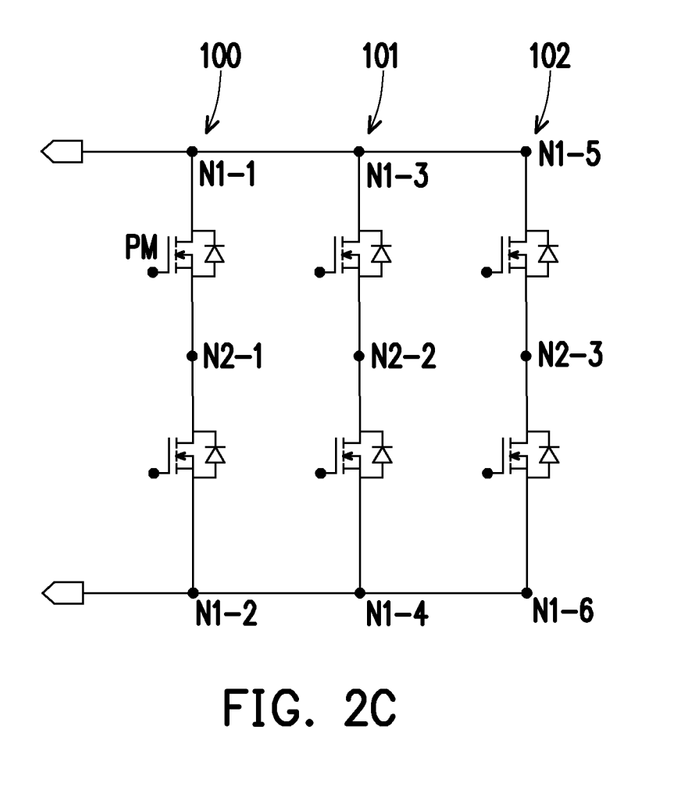

FIG. 2C is similar to FIG. 2B but differs in that three half-bridge circuits 100 to 102 of the first transformation circuit 10 in FIG. 2C are selected. The three selected half-bridge circuits 100 to 102 are connected, so that the first transformation circuit 10 is operated in the voltage boosting and bucking mode, the rectifier mode, or the inverter mode. Specifically, when the first transformation circuit 10 is operated in the inverter mode, nodes (e.g., first nodes) N1-1 to N1-6 located at two ends and serially connected to two power switch devices (e.g., the transistors PM) in the half-bridge circuits 100 to 102 may be coupled to an external power source to receive the DC voltage and convert the DC voltage to the AC voltage, and the converted AC voltage is provided to the motor through nodes (e.g., the second nodes) N2-1 to N2-3 coupled between the two power switch devices (e.g., the transistors PM). When the first transformation circuit 10 is operated in the rectifier mode, the nodes (e.g., the second nodes) N2-1 to N2-3 coupled between the two power switch devices (e.g., the transistors PM) in the half-bridge circuits 100 to 102 may be coupled to an external power source to receive the AC voltage, and the nodes (e.g., the first nodes) N1-1 to N1-6 located at two ends and serially connected to the two power switch devices (e.g., the transistors PM) may provide the converted DC voltage to the respective ends of the second transformation circuit 11. When the first transformation circuit 10 is operated in the voltage boosting and bucking mode, the nodes (e.g., the second nodes) N2-1 to N2-3 coupled between the two power switch devices (e.g., the transistors PM) in the half-bridge circuits 100 to 102 may be coupled to an external power source to receive the DC voltage and, together with other devices, such as inductors or capacitors, perform a voltage boosting and bucking operation on the DC voltage, and the nodes (e.g., the first nodes) N1-1 to N1-6 located at two ends and serially connected to the two power switch devices (e.g., the transistors PM) may provide the boosted and bucked DC voltage to the respective ends of the second transformation circuit 11.

Figure 2D:
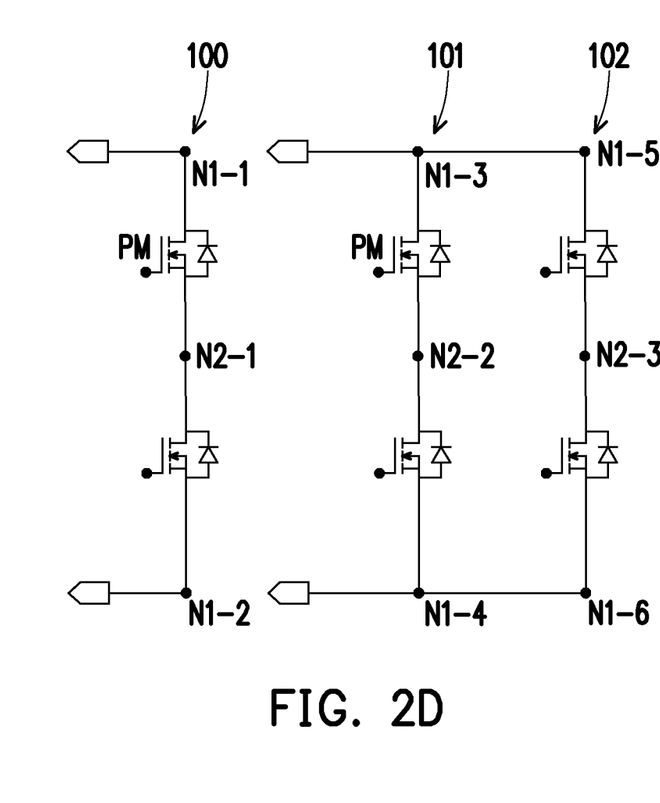

In FIG. 2D, the half-bridge circuits 101 and 102 of the first transformation circuit 10 are connected and operated in the rectifier mode or the inverter mode, and the other half-bridge circuit 100 is controlled to be operated as a buck-boost circuit. Specifically, when the half-bridge circuits 101 and 102 of the first transformation circuit 10 are operated in the rectifier mode, the half-bridge circuits 101 and 102 may convert the AC voltage provided by the external power source to the DC voltage. As such, the half-bridge circuit 100 cooperates with other appropriate passive devices to collectively perform the voltage boosting and bucking operation on the DC voltage converted by the half-bridge circuits 101 and 102 and then provides the DC voltage to the second transformation circuit 11. In addition, when the half-bridge circuits 101 and 102 of the first transformation circuit 10 are operated in the inverter mode, the half-bridge circuit 100 cooperates with other appropriate passive devices to collectively convert the DC voltage provided by the external power source to an appropriate voltage level and provide the DC voltage to at least one of the second transformation circuit 11, the half-bridge circuit 101, and the half-bridge circuit 102 operated in the inverter mode, so that the at least one of the second transformation circuit 11, the half-bridge circuit 101, and the half-bridge circuit 102 may according to an appropriate DC voltage level, convert the DC voltage into the AC voltage to be grid-connected with single-phase power for further parallel control and application or drive the motor.

Figure 2E:
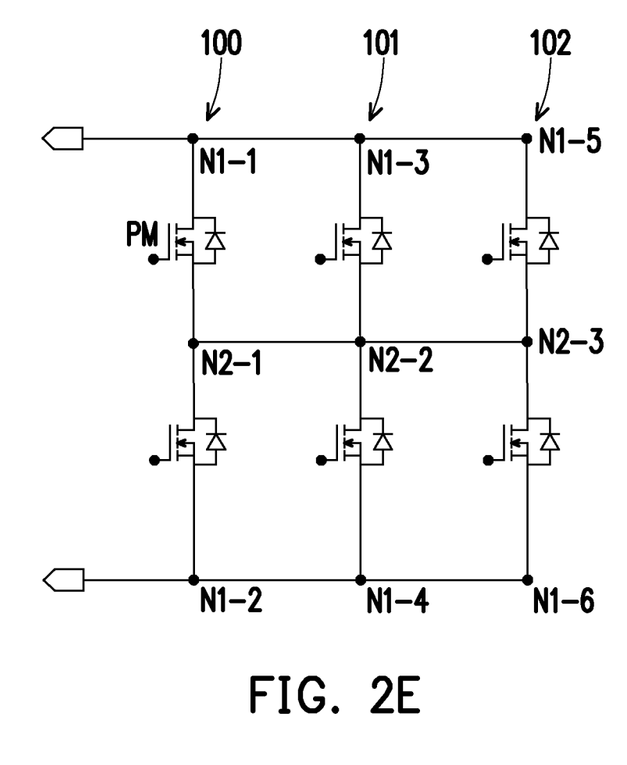

As shown in FIG. 2E, in the first transformation circuit 10, the three half-bridge circuits (e.g., the half-bridge circuits 100 to 102) may be, for instance, switched to be operated as a boost circuit or a buck circuit, so as to adjust the DC voltage provided by the external power source to an appropriate voltage level. More specifically, in addition to connecting the nodes (e.g., the first nodes) N1-1 to N1-6 at both ends of each of the half-bridge circuits 100 to 102, the nodes (e.g., the second nodes) N2-1 to N2-3 among the power switch devices (e.g., the transistors PM) in the three half-bridge circuits 100 to 102 are also coupled to for connecting the half-bridge circuits 100 to 102 in parallel. Thereby, the half-bridge circuits 100 to 102 may be characterized by the improved current resistance during the voltage boosting and bucking operation, thus improving the PIM 1.

For instance, the DC voltage level adjusted by the first transformation circuit 10 may be, for instance, provided to the second transformation circuit 11, so that the second transformation circuit 11 may generate the AC voltage according to the appropriate DC voltage level and then drive the motor.

Figure 3:
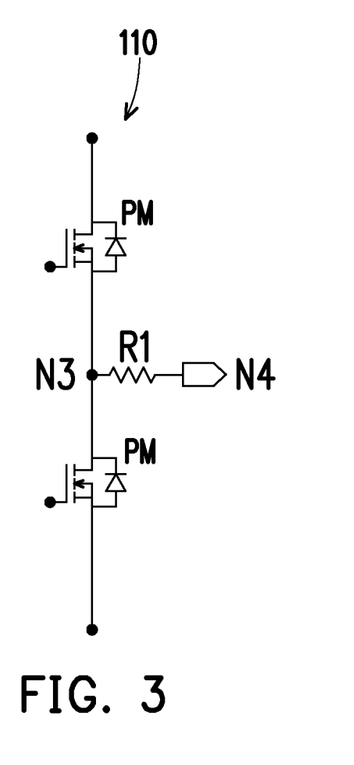
FIG. 3 is a schematic view illustrating a shunt unit according to an embodiment of the disclosure.

FIG. 3 is a schematic view illustrating a shunt unit according to an embodiment of the disclosure. In the present embodiment, although the half-bridge circuit 110 of the second transformation circuit 11 serves as an example for illustration, any of the half-bridge circuits of the first transformation circuit 10 and the second transformation circuit 11 is certainly applicable. Particularly, the shunt unit may be, for instance, implemented in form of the resistor R1, one end of the shunt unit is connected to a node N3 between two power switch devices (e.g., the transistors PM), and a node N4 at the other end of the shunt unit serves as an input or output node. Thereby, when the first transformation circuit 10 is operated in the inverter mode, each selected half-bridge circuit may receive the DC voltage from the external power source through both ends of the serially connected power switch devices and may be coupled to the motor through the shunt unit, so that the first transformation circuit 10 in the inverter mode converts the DC voltage to the AC voltage for performing a driving operation. In another aspect, when the first transformation circuit 10 is operated in the rectifier mode, each selected half-bridge circuit may receive the AC voltage from the external power source through the shunt unit and generate the converted DC voltage at both ends of the serially connected power switch devices, so that the first transformation circuit 10 in the rectifier mode converts the AC voltage to the DC voltage.

Figure 4:
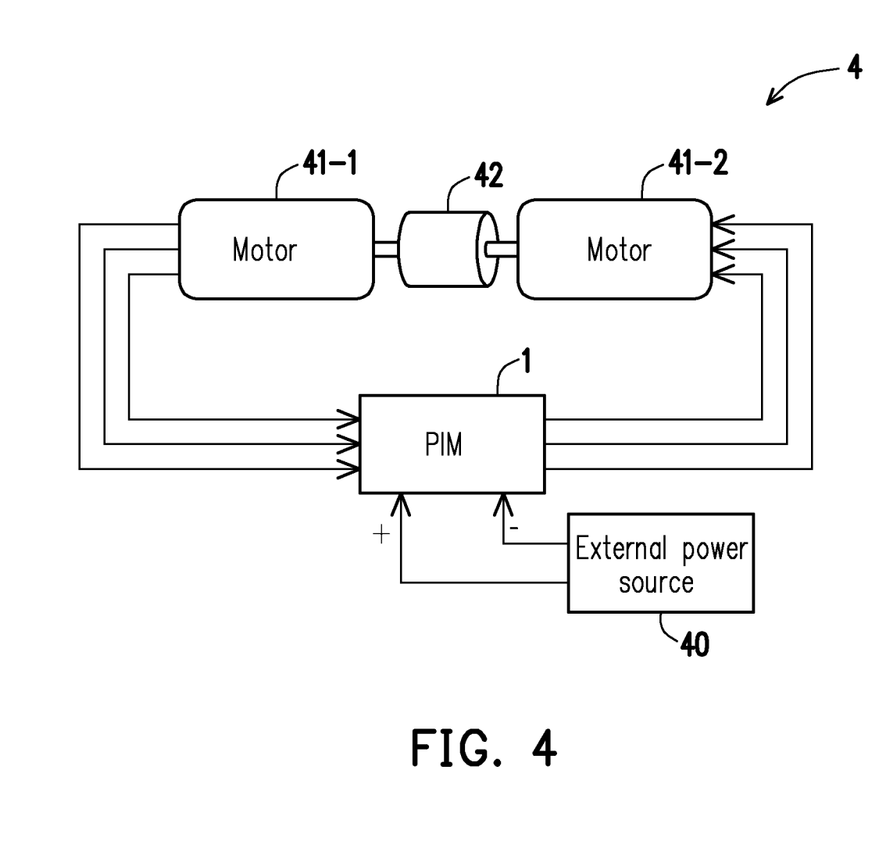
FIG. 4 is a schematic block view illustrating a motor control system according to an embodiment of the disclosure.

FIG. 4 is a schematic block view illustrating a motor control system 4 according to an embodiment of the disclosure. The motor control system 4 includes an external power source 40, a PIM 1, motors 41-1 and 41-2, and a connection axle 42. The description of the operation of the PIM 1 may be referred to as the descriptions provided in the above paragraphs with reference to FIG. 1, FIG. 2A to FIG. 2E, and FIG. 3 and thus will not be repeated hereinafter. In addition to the descriptions provided in the above paragraphs, when the first transformation circuit 10 in the PIM 1 is operated in the inverter mode, the first transformation circuit 10 and the second transformation circuit 11 may be respectively coupled to different motors to form different loops for performing a driving operation. Besides, the PIM 1 may also be coupled together as shown in FIG. 4 to form one single loop for performing the driving operation.

Specifically, the motors 41-1 and 41-2 may be connected through the connection axle 42. The motor 41-2 is coupled to the second transformation circuit 11 in the PIM 1 and may be driven by the second transformation circuit 11. In addition, the motor 41-1 is coupled to the first transformation circuit 10 in the PIM 1 and may be driven by the connection axle 42 to generate electrical energy, the electrical energy is provided to the first transformation circuit 10 in the PIM 1, and the electrical energy converted by the first transformation circuit 10 may 10 may be further provided to the second transformation circuit 11.

The motor control system 4 may be, for instance, an energy regeneration system, and when the motor 41-2 is driven and operated, the motor 41-1 may be accordingly driven. Through activating the first transformation circuit 10 at an appropriate timing, the rotation of the motor 41-1 may drive the first transformation circuit 10 to generate power, and the kinetic energy of the motor 41-2 may be converted into the electrical energy and stored. Since the electrical energy generated by the motor 41-1 is an AC voltage, the AC voltage may be converted to a DC voltage through the first transformation circuit 10 in the PIM 1 for energy storage.

To sum up, the first transformation circuit in the PIM and the motor control system may be controlled by a plurality of half-bridge circuits formed by the power switch devices. In addition to providing a variety of circuit connection combinations, power consumption may also be reduced because the loss resulting from voltage conversion in the entire process is effectively reduced. Besides, the shunt unit is also integrated into the PIM. Compared with a surface mount device or a pin connected to an external device, the shunt unit integrated into the PIM may effectively reduce the overall circuit volume and save the manufacturing costs. In addition, the shunt unit disposed between the half-bridge circuits and the motor may reduce noise crosstalk and effectively improve the current sensing accuracy.

It will be apparent to those skilled in the art that various modifications and variations could be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A power integrated module, adapted to drive at least one motor and comprising:
   a first transformation circuit, comprising at least three first half-bridge circuits, wherein a coupling relationship among the at least three first half-bridge circuits is selected, so that the first transformation circuit is operated in a voltage boosting and bucking mode, a rectifier mode, or an inverter mode;
   a second transformation circuit, comprising at least three second half-bridge circuits to form an inverter and coupled to a first motor; and
   at least three first shunt units, respectively coupled between the at least three second half-bridge circuits and the first motor and configured to sense a current between the second transformation circuit and the first motor.

2. The power integrated module according to claim 1, wherein the first half-bridge circuits and the second half-bridge circuits respectively comprise at least two switch devices connected in series, and the first half-bridge circuits and the second half-bridge circuits have a pair of first nodes located at two ends and a second node located between the at least two switch devices.

3. The power integrated module according to claim 2, wherein when each of the first half-bridge circuits in the first transformation circuit is nonconductive to each other, the first transformation circuit is operated in the voltage boosting and bucking mode, and the pair of first nodes of one of the first half-bridge circuits is coupled to an external power source, so as to perform a voltage boosting and bucking operation on a direct current voltage input by the external power source.

4. The power integrated module according to claim 3, wherein the second transformation circuit receives the direct current voltage where the voltage boosting and bucking operation is performed by the first transformation circuit and converts the direct current voltage into an alternating current voltage to drive the first motor.

5. The power integrated module according to claim 2, wherein when at least two groups of the first half-bridge circuits in the first transformation circuit are selected and coupled, and the pair of first nodes of each of the first half-bridge circuits is coupled to an external power source, the first transformation circuit is operated in the voltage boosting and bucking mode, so as to perform a voltage boosting and bucking operation on a direct current voltage provided by the external power source and provide the direct current voltage to the second transformation circuit.

6. The power integrated module according to claim 2, wherein when at least two groups of the first half-bridge circuits in the first transformation circuit are selected and coupled, and the second node of each of the first half-bridge circuits is coupled to an external power source, the first transformation circuit is operated in the rectifier mode, so as to convert an alternating current voltage input by the external power source into a direct current voltage and provide the direct current voltage to the second transformation circuit.

7. The power integrated module according to claim 6, wherein when the at least two groups of the first half-bridge circuits in the first transformation circuit are selected to enable the first transformation circuit to be operated in the rectifier mode, the non-selected first half-bridge circuits in the first transformation circuit are operated in the voltage boosting and bucking mode and configured to perform a voltage boosting and bucking operation on the direct current voltage and provide the direct current voltage to the second transformation circuit.

8. The power integrated module according to claim 2, wherein when at least two groups of the first half-bridge circuits in the first transformation circuit are selected and coupled, and the pair of first nodes of each of the first half-bridge circuits is coupled to an external power source, the first transformation circuit is operated in the inverter mode, so as to convert a direct current voltage input by the external power source into an alternating current voltage.

9. The power integrated module according to claim 8, wherein when three groups of the first half-bridge circuits in the first transformation circuit are selected and coupled to form a three-phase inverter, the first transformation circuit converts a direct current voltage output by an external power source into an alternating current voltage to drive a second motor.

10. The power integrated module according to claim 2, when at least two groups of the first half-bridge circuits in the first transformation circuit are selected and coupled and the second node of each of the first half-bridge circuits are connected to each other, the first transformation circuit is operated in the voltage boosting and bucking mode and configured to perform a voltage boosting and bucking operation on a direct current voltage provided by an external power source and provide the direct current voltage to the second transformation circuit.

11. The power integrated module according to claim 1, wherein each of the at least three first shunt units is a shunt resistor disposed inside the power integrated module.

12. The power integrated module according to claim 1, further comprising at least three second shunt units respectively coupled to the at least three first half-bridge circuits and configured to sense a current flowing through the first transformation circuit,
wherein a quantity of the first shunt units is equal to a quantity of the second half-bridge circuits, and a quantity of the second shunt units is equal to a quantity of the first half-bridge circuits.

13. The power integrated module according to claim 1, further comprising a first brake arm and a second brake arm respectively connected in parallel to the first transformation circuit and the second transformation circuit.

14. The power integrated module according to claim 1, further comprising a first temperature sensing device and a second temperature sensing device respectively disposed adjacent to the first transformation circuit and the second transformation circuit and configured to respectively sense an operating ambient temperature of the first transformation circuit and the second transformation circuit.

15. A motor control system, comprising:
a first motor;
a second motor; and
a power integrated module, comprising:
 a first transformation circuit, comprising at least three first half-bridge circuits, wherein a coupling relationship among the at least three first half-bridge circuits is selected, so that the first transformation circuit is operated in a voltage boosting and bucking mode, a rectifier mode, or an inverter mode and coupled to the first motor;
 a second transformation circuit, comprising at least three second half-bridge circuits which are coupled to the second motor, wherein the second transformation circuit is configured to drive the second motor; and
 at least three first shunt units, respectively coupled between the at least three second half-bridge circuits and the second motor and configured to sense a current between the second transformation circuit and the second motor.

16. The motor control system according to claim 15, wherein the first transformation circuit is operated in the inverter mode, the first transformation circuit drives the first motor by receiving a power from an external power source, the second transformation circuit drives the second motor by receiving the power from the external power source, the first transformation circuit and the first motor form a loop, and the loop is different from another loop formed by the second transformation circuit and the second motor.

17. The motor control system according to claim 15, wherein the second transformation circuit, the first motor, the second motor, and the first transformation circuit together form a loop.

18. The motor control system according to claim 17, further comprising a connection axle coupled between the first motor and the second motor.

19. The motor control system according to claim 18, wherein the second transformation circuit drives the second motor, and the first motor is driven by the connection axle to generate electrical energy and provide the electrical energy to the first transformation circuit.

20. The motor control system according to claim 19, wherein the first transformation circuit is operated in the rectifier mode to convert electrical energy of an alternating current provided by the first motor into a direct current and provide the direct current to the second transformation circuit.

* * * * *